United States Patent
Tervo (10) Patent No.: US 10,215,986 B2
(45) Date of Patent: Feb. 26, 2019

(54) WEDGES FOR LIGHT TRANSFORMATION

(71) Applicant: MICROSOFT TECHNOLOGY LICENSING, LLC, Redmond, WA (US)

(72) Inventor: Jani Kari Tapio Tervo, Espoo (FI)

(73) Assignee: Microsoft Technology Licensing, LLC, Redmond, WA (US)

(*) Notice: Subject to any disclaimer, the term of this patent is extended or adjusted under 35 U.S.C. 154(b) by 66 days.

(21) Appl. No.: 15/155,431

(22) Filed: May 16, 2016

(65) Prior Publication Data
US 2017/0329137 A1 Nov. 16, 2017

(51) Int. Cl.
*G02B 27/01* (2006.01)
*F21V 8/00* (2006.01)

(52) U.S. Cl.
CPC ......... *G02B 27/0172* (2013.01); *G02B 6/003* (2013.01); *G02B 6/0026* (2013.01); *G02B 6/0076* (2013.01); *G02B 2027/0125* (2013.01); *G02B 2027/0174* (2013.01); *G02B 2027/0178* (2013.01)

(58) Field of Classification Search
CPC ........ G02B 6/011; G02B 6/013; G02B 6/016; G02B 6/0018; G02B 6/0026; G02B 6/0033; G02B 6/0036; G02B 27/0101; G02B 27/0172
USPC .................... 359/15, 16, 629, 630, 633, 634
See application file for complete search history.

(56) References Cited

U.S. PATENT DOCUMENTS

| | | | | |
|---|---|---|---|---|
| 5,369,415 A | * | 11/1994 | Richard | G02B 27/0172 345/6 |
| 6,005,720 A | * | 12/1999 | Watters | G02B 21/0008 359/633 |
| 6,163,379 A | | 12/2000 | de Groot | |
| 6,204,974 B1 | * | 3/2001 | Spitzer | G02B 27/017 359/630 |

(Continued)

FOREIGN PATENT DOCUMENTS

| | | |
|---|---|---|
| EP | 1748305 | 1/2007 |
| EP | 2784569 | 10/2014 |

OTHER PUBLICATIONS

Maimone, et al., "Computational Augmented Reality Eyeglasses", In Proceedings of IEEE International Symposium on Mixed and Augmented Reality, Oct. 1, 2013, pp. 29-38.

(Continued)

*Primary Examiner* — Nicholas R. Pasko
(74) *Attorney, Agent, or Firm* — Workman Nydegger (57) ABSTRACT

Devices, systems and methods that include specialized waveguide assemblies are provided for performing light transformations. Some waveguide assemblies include a waveguide and a compensating lens. The waveguide includes a front surface and a back surface, wherein the waveguide is configured to receive external light at the front surface and transmit the external light through the waveguide to the back surface. The compensating lens is located on the back surface and is configured to direct light emitted from the back surface toward an exit pupil proximate the back surface. The compensating lens has an input surface oriented toward the waveguide and an opposing output surface oriented away from the waveguide. The waveguide can sometimes increase a user's field of view with minimal distortion on a mixed reality display.

20 Claims, 9 Drawing Sheets

(56) References Cited

U.S. PATENT DOCUMENTS

| | | | |
|---|---|---|---|
| 6,222,677 B1 * | 4/2001 | Budd | G02B 27/0172 359/630 |
| 6,542,307 B2 * | 4/2003 | Gleckman | G02B 27/0172 359/627 |
| 7,410,286 B2 | 8/2008 | Travis | |
| 7,477,453 B2 * | 1/2009 | Repetto | G02B 17/0856 359/630 |
| 7,724,441 B2 | 5/2010 | Amitai | |
| 8,059,342 B2 * | 11/2011 | Burke | G02B 27/0101 345/8 |
| 8,152,306 B2 | 4/2012 | Liu et al. | |
| 8,467,133 B2 | 6/2013 | Miller | |
| 8,520,310 B2 * | 8/2013 | Shimizu | G02B 27/0172 345/7 |
| 8,649,099 B2 * | 2/2014 | Schultz | B29D 11/00663 359/630 |
| 8,665,178 B1 * | 3/2014 | Wang | G02B 27/0172 345/7 |
| 8,731,349 B2 | 5/2014 | Schrauwen et al. | |
| 8,810,914 B2 * | 8/2014 | Amitai | H04N 13/344 359/633 |
| 8,861,081 B2 * | 10/2014 | Mansharof | H04N 13/344 359/489.07 |
| 9,110,200 B2 | 8/2015 | Nichol et al. | |
| 9,223,138 B2 | 12/2015 | Bohn | |
| 2007/0070859 A1 * | 3/2007 | Hirayama | G02B 5/32 369/112.04 |
| 2010/0111472 A1 | 5/2010 | DeJong | |
| 2013/0314793 A1 | 11/2013 | Robbins et al. | |
| 2014/0064655 A1 | 3/2014 | Nguyen et al. | |
| 2015/0235439 A1 | 8/2015 | Schowengerdt | |

OTHER PUBLICATIONS

"International Search Report and the Written Opinion" issued in PCT Application PCT/US2017-031471 dated Aug. 14, 2017.

* cited by examiner

WEDGES FOR LIGHT TRANSFORMATION

CROSS-REFERENCE TO RELATED APPLICATIONS

N/A

BACKGROUND

Background and Relevant Art

Near-eye display (NED) devices such as head-mounted display (HMD) devices have been introduced into the consumer marketplace recently to support visualization technologies such as mixed reality (MR), which includes augmented reality (AR) and virtual reality (VR). An NED device may include components such as one or more light sources, microdisplay modules, controlling electronics, and various optics such as waveguides, lenses, beam splitters, and so forth.

Waveguides are used in NED devices to convey or direct light representing artificially-generated images from the image generation components of the device to an eye of a user. In this regard, waveguides in an NED devices act as the device's image output interface to the user. Accordingly, waveguides in NED devices are sometimes referred to as "output waveguides."

In some NED devices, computer-generated images are projected from a transparent output waveguide relative to the real-world environment that the user also views through the output waveguide. This enables the computer-generated images to appear to interact with the real-world environment. In some AR applications, the projected images are directly superimposed on the location of other objects within the user's field of view.

The "location" of the computer-generated images that the user perceives as existing in the real-world environment must be precisely calculated and generated. Any errors in conveyance of the computer-generated image through the output waveguide to the eye of the user, or distortion of the computer-generated images in relation to the real-world environment, can cause discomfort or disorientation to the user. In some applications, errors in conveyance of the computer-generated image or distortion of the computer-generated images may reduce the perceived reality and overall utility of the MR display.

The field of view (FOV) of a NED device is often limited by the orientation of the output waveguide relative to the eye of the user. Sometimes it is possible to increase the FOV by modifying the orientation of the output waveguides, such that they wrap around the eyes of the user. However, these types of changes to the orientation of the waveguides can create additional challenges for connecting and assembly the output waveguide and for aligning MR projections with objects within the user's FOV.

BRIEF SUMMARY

The disclosed embodiments include devices, systems and methods that include specialized waveguide assemblies for performing light transformations. Some of these embodiments are operable to increase a user's FOV and/or/" increase the precision for projecting images at desired locations with NED devices relative to the user's FOV.

In some embodiments, a waveguide assembly is provided with a waveguide and a compensating lens. The waveguide includes a front surface and a back surface and is configured to receive external light at the front surface and transmit the external light through the waveguide to the back surface. The compensating lens is located on the back surface and configured to direct light emitted from the back surface toward an exit pupil proximate the back surface. The compensating lens has an input surface and an output surface. The input surface is oriented toward the waveguide and the outer surface is oriented away from the waveguide. The input surface and output surface form a non-zero compensating angle. In some embodiments, a head mounted NED system is configured to include a waveguide assembly, a light source optically coupled to the waveguide assembly, and a housing that supports the waveguide assembly and the light source. The waveguide assembly includes a first waveguide and a compensating lens. The waveguide includes a front surface and a back surface and is configured to receive external light at the front surface and transmit the external light through the first waveguide to the back surface. The compensating lens is located on the back surface and configured to direct light emitted from the back surface toward an exit pupil proximate the back surface. The compensating lens has an input surface and an output surface. The input surface is oriented toward the first waveguide and the outer surface is oriented away from the first waveguide. The input surface and output surface form a non-zero compensating angle. The light source is oriented to provide a signal light to the waveguide assembly.

Disclosed embodiments also include methods of guiding light through a waveguide assembly by refracting a signal light from a light source at an angle relative to a waveguide, in-coupling the signal light to propagate along the waveguide, mixing the signal light with an external light, out-coupling the signal light from the waveguide to output an outgoing signal light, and compensating the direction of the outgoing signal light with a compensating lens to direct the outgoing signal light toward an exit pupil.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that these drawings depict only typical embodiments and are not therefore to be considered to be limiting in scope, embodiments will be described and explained with additional specificity and detail through the use of the accompanying drawings in which.

DETAILED DESCRIPTION

Disclosed embodiments include devices, systems, and methods for enabling mixing of external light and a computer-generated signal light, sometimes with a greater FOV than is possible with conventional waveguide or NED systems. Various embodiments of the disclosed devices, systems and methods will now be provided. With regard to the following disclosure, it will be appreciated that in the development of the disclosed embodiment(s), as in any engineering or design project, numerous embodiment-specific decisions will be made to achieve the developers' specific goals, such as compliance with system-related and business-related constraints, which may vary from one embodiment to another. It should further be appreciated that such a development effort might be complex and time consuming, but would nevertheless be a routine undertaking of design, fabrication, and manufacture for those of ordinary skill having the benefit of this disclosure.

The FOV of some MR NED devices are limited by the angle of the signal light moving through the waveguide, as described above, and by the following.

The signal light of NED devices is generated by a light source, such as microdisplay modules, image generators, or other signal light device(s). This signal light is projected as computer-generated images and/or data at the NED waveguide, which is typically configured as a substantially planar waveguide which is operable to guide the signal light from the light source(s), through the waveguide, toward a photoreceptor, such as a user's eye. The signal light may be in-coupled to the waveguide to propagate internally along the waveguide at a propagating angle.

The FOV over which the signal light emitted from the waveguide is visible to a user is limited by the orientation of the light source and/or the user relative to the waveguide. However, the range of physical orientations that may be utilized with the waveguide(s) of NED devices can be somewhat limited, particularly for wearable devices, such as HMD devices. For instance, the wrap, or amount of rotation of the waveguide about a vertical rotational axis, and the tilt, or amount of rotational of the waveguide about a horizontal rotational axis, may be limited by the physical constraints of the housing and body of the device. Sometimes, these constraints are physical constraints based on the application and environment (i.e., the shape of a user's face). The constraints can also be based on physics, such as the external optics of the device (i.e., high degrees of wrap and/or tilt may adversely affect transmission of external light from the surrounding environment through the waveguide), or combinations thereof.

Some of the disclosed embodiments are able to compensate for the typical constraints described above, by creating an "artificial wrap and/or tilt" that is operable to increase the user's FOV provided by NED devices and other waveguide assemblies, by including at least one compensating lens to compensate for the incident angle during output of the signal light from the waveguide toward the user's eye. In some embodiments, the disclosed waveguide assemblies further include a transformation lens to direct the signal light from the light source to the waveguide at the incident angle.

Figure 1:
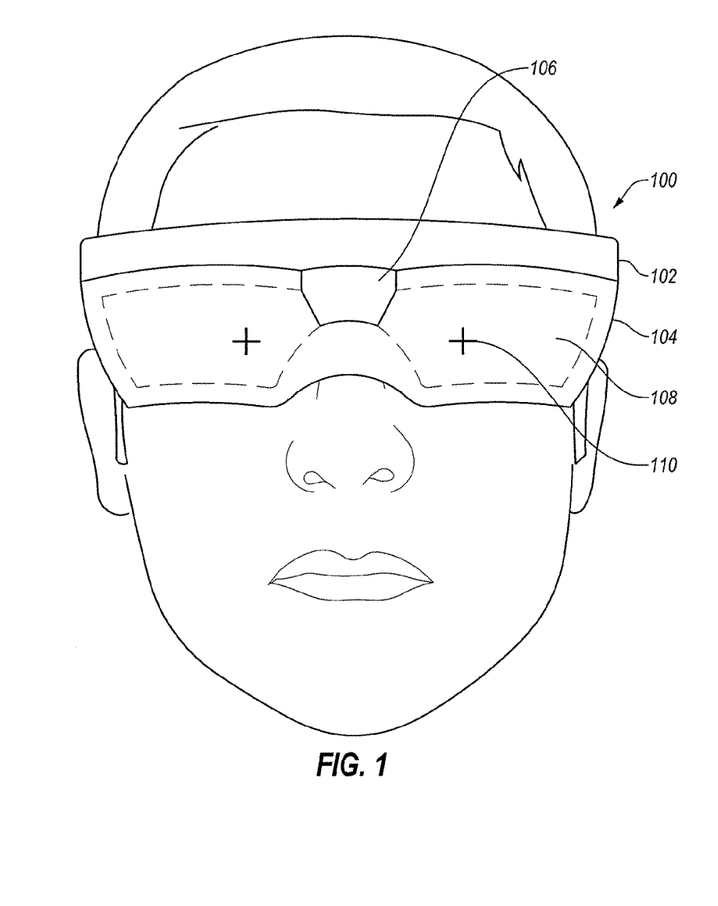
FIG. 1 illustrates a front view of a NED in a head mounted device, according to one or more of the disclosed embodiments.

As shown in FIG. 1, an HMD device 100 includes a housing 102 that supports a visor 104 and a light source 106. The light source 106 is in optical communication with a waveguide assembly including a waveguide 108 (which may include one, two or more waveguides 108). The housing 102 is configured to support the waveguide 108 at least partially in front of an eye center 110 of the user. The eye center 100 is a location located near the center of a user's eye, when the device is worn, and which is positioned to operably render images to the user. The waveguide 108 guides a projected signal light from the light source 106 through the waveguide 108. At least some of the projected/transmitted signal light is ultimately emitted from the waveguide 108 towards the user's eye(s), such that the signal light is viewable/viewed by the user's eye(s).

In some instances, the waveguide 108 is optically transparent to external light, such that the waveguide 108 allows the user to view their surroundings through the waveguide 108, while also viewing the signal light from light source 106 that is mixed with the ambient light of the surroundings. For example, the waveguide 108 may transmit greater than 80% of external light to the user's eye. In other examples, the waveguide 108 may transmit greater than 85% of external light to the user's eye. In yet other examples, the waveguide 108 may transmit greater than 90% of the external light to the user's eye.

The light source 106 may provide the signal light in the waveguide 108 from a central position (e.g., eye center 110), as shown in FIG. 1. In other embodiments, the light source 106 may be positioned at other locations relative to the waveguide 108, such at along a top edge, a bottom edge, or exterior edges of the waveguide 108.

Figure 2A:
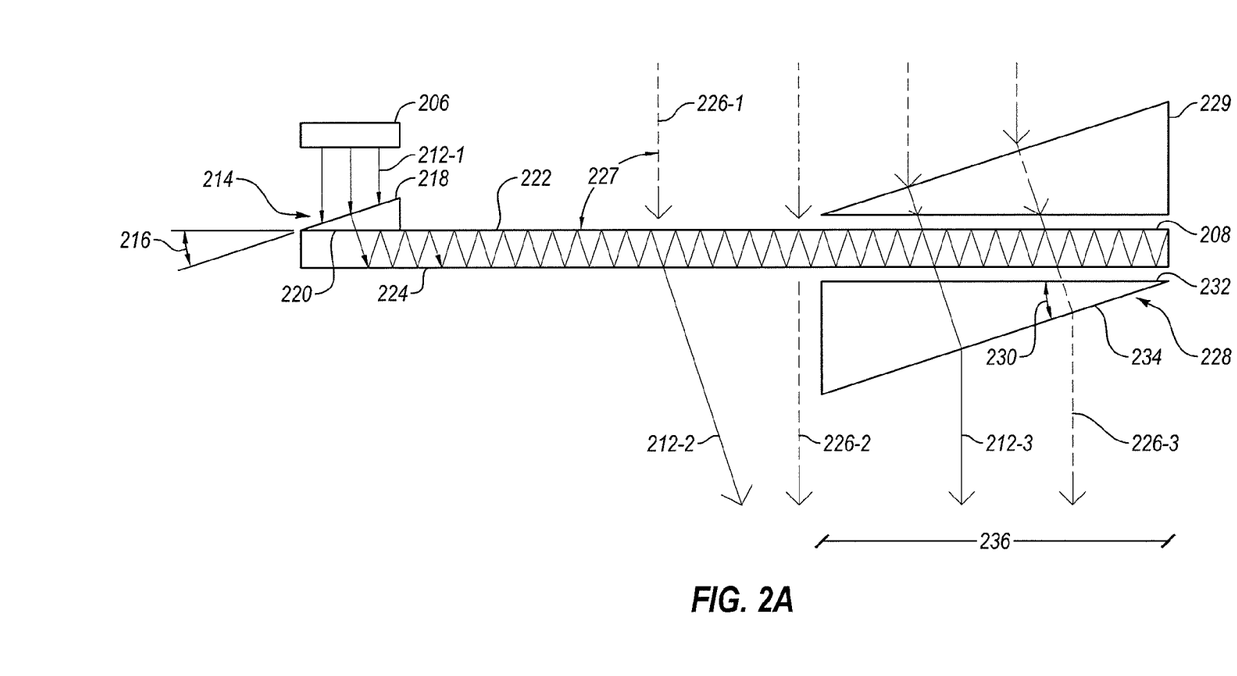
FIG. 2A illustrates light movement through a waveguide assembly, which includes a transformation lens and a compensating lens, according to one or more of the disclosed embodiments.

FIG. 2A illustrates a top view of an embodiment of a waveguide assembly that is operable to direct signal light from a light source 206 there through to a user's eye, such as described in FIG. 1. The waveguide assembly includes a waveguide 208 that guides an input signal light 212-1 from the light source 206 and emit an output signal light 212-2 toward the user's eye.

The waveguide assembly according to some instances, also includes a transformation lens 214 to refract the input signal light 212-1 from the light source 206 into the waveguide 208. The transformation lens 214 is configured to have a non-zero (e.g., non-parallel) transformation angle 216 between an input surface 218 and an opposing output surface 220. The transformation angle 216, which is formed by the input surface 218 and the output surface 220, directs the input signal light 212-1 into the waveguide 208 at a different angle than the input signal light 212-2 enters the in-coupling lens 214. For example, the transformation lens 214 may be a prism that deflects the incoming input signal light 212-1 by a predetermined amount. In at least one embodiment, the transformation lens 214 is an in-coupling lens with an in-coupling diffractive optical element (DOE) between the transformation lens 214 and the waveguide 208 to in-couple the signal light into the waveguide 208.

The deflection of the signal light 212-1 through the transformation lens 214 may be at least partially related to the transformation angle 216. The deflection may also be at least partially related to the material of the transformation lens 214. For example, the refraction of the signal light at each surface of the transformation lens can be modeled by Snell's Law:

$$\frac{\sin\theta_1}{\sin\theta_2} = \frac{v_1}{v_2} = \frac{\lambda_1}{\lambda_2} = \frac{n_2}{n_1}$$

Where $\theta_1$ is the angle of the incoming light toward an interface, $\theta_2$ is the angle of the refracted light after the interface, $v_1$ is the velocity of the incoming light, $v_2$ is the velocity of the refracted light, $\lambda_1$ is the wavelength of the light in the first medium (for example, air), $\lambda_2$ is the wavelength of the light in the second medium (for example, the transformation lens 214), $n_1$ is the index of refraction of the first medium, and $n_2$ is the index of refraction of the second medium.

From Snell's Law, one can find that the incoming angle and the refracted angle are dependent upon the wavelength of the light in question and the relative index of refraction across the interface. FIG. 2A illustrates the transformation lens 214 proximal to the waveguide 208, with a gap there between (such as an air gap). In other embodiments, not shown, the transformation lens 214 directly abuts the waveguide 208, such that there is no gap.

When light is transmitted through a material having parallel surfaces, the two interfaces approximately cancel one another and the light will emerge from the second interface at substantially the same orientation as entering the first interface. The transformation angle 216 allows the interaction across the input surface 218 and output surface 220 of the transformation lens 214 to be different, and result in a net orientation change to the signal light. In some embodiments, the transformation angle 216 of the transformation lens is within a range having an upper value, a lower value, or an upper and lower value including any of 5°, 10°, 15°, 20°, 25°, 30°, 35°, 40°, 45°, or any values there between. For example, the transformation angle 216 may be greater than 5°. In another example, the transformation angle 216 may be less than 45°. In yet another example, the transformation angle 216 may be between 5° and 45°. In further examples, the transformation angle 216 may be between 20° and 35°. In at least one example, the transformation angle 216 may be less than 30°. In yet other embodiments, the transformation angle 216 is less than 5° or greater than 45°.

The transformation lens 214 is made of or includes a transformation lens material. In some embodiments, the transformation lens material comprises glass, a polymer such as polyacrylic, quartz, and/or any other optically clear material in the visible light range.

The index of refraction of the transformation lens 214 may be in a range having an upper value, a lower value, or an upper and lower value including any of 1.5, 1.6, 1.7, 1.8, 1.9, 2.0 or any values there between. For example, the index of refraction of the transformation lens 214 may be greater than 1.5. In another example, the index of refraction of the transformation lens 214 may be less than 2.0. In yet another example, the index of refraction of the transformation lens 214 may be between 1.5 and 2.0. In further examples, the index of refraction of the transformation lens 214 may be between 1.7 and 1.9. In at least one example, the index of refraction of the transformation lens 214 may be about 1.8. However, in other embodiments, the index of refraction is less than 1.5 or greater than 2.0.

The input signal light 212-1 is deflected from the original orientation (i.e., as produced by the light source 206) before entering the waveguide 208. The signal light may be conveyed by the waveguide 208 via total internal reflection of the signal light. Total internal reflection inside the waveguide 208 is the continual reflection of light within the waveguide 208 between a front surface 222 and a back surface 224. The transformation lens 214 may deflect the input signal light 212-1 such that the signal light in the waveguide 208 is oriented at an angle less than the critical angle to emit from the waveguide 208.

The waveguide 208 will generally propagate light through the waveguide 208 until the signal light is emitted from the waveguide 208, such as by interaction with a DOE, by altering the propagation angle to exceed the critical angle, or by other mechanism to allow an output signal light 212-2 to leave the waveguide 208. The output signal light 212-2 may leave the waveguide 208 at an angle to the back surface 224, which may be presented as and experienced by a user as a distorted image corresponding to the initial computer-generated image (depicted by the input signal light 212-1).

The waveguide 208 may mix the signal light with external light, allowing the computer-generated image of the signal light to be overlaid with the user's perception of the real world seen by the external light. The input external light 226-1 may be approximated to approach the waveguide 208 at an external light incident angle 227 that is substantially normal to the front surface 222 of the waveguide 208. The input external light 226-1 may, therefore, be transmitted through waveguide 208 with little refraction by the waveguide 208. Without any further interactions, the output external light 226-2 may continue through the waveguide 208 and out the back surface 224 toward the user.

To allow the output signal light 212-2 to approach the user at an appropriate angle, and to thereby reduce perceived distortions, the angle of the signal light may be altered again to compensate for the interaction of the input signal light 212-1 with the transformation lens 214. According to some embodiments, a compensating lens 228 is positioned proximal the back surface 224 of the waveguide 208 to, again, refract the signal light to produce a compensated signal light 212-3. In some embodiments, a DOE or other out-coupling mechanism is also positioned on a surface of the waveguide 208 and/or compensating lens 228 to out-couple the light propagating in the waveguide 208 in a desired placement.

External light passing through the compensating lens 228 may also be refracted by the compensating lens 228. In some instances, an external light transformation lens 229 also alter the direction of the input external light 226-1 such that the external light enters the waveguide 208 at the same angle as the signal light propagating along the waveguide 208.

The external light transformation lens 229 may be a prism with the same transformation angle 214 as the transformation lens 214. In some embodiments, the external light transformation lens 229 is made of or includes any of the materials described above, including the transformation lens material used for the transformation lens 214. In other embodiments, the external light transformation lens 229 is made of or includes a different material than the transformation lens 214.

The input signal light 212-1 and input external light 226-1 are mixed in the waveguide 208. Upon out-coupling of the mixed signal light and external light in the waveguide 208, the compensating lens 228 alters the direction of propagation of both the signal light and external light to produce a mixed compensated signal light 212-3 and compensated external light 226-3.

The compensating lens 228 has a non-zero (e.g., non-parallel) compensating angle 230 that is defined by the relationship of an input surface 232 and an opposing output surface 234 of the compensating lens 228. In some embodiments, the compensating angle 230 may be equal to the transformation angle 216. In other embodiments, the compensating angle 230 may be different from the transformation angle 216.

The compensating lens 228 may also be made of or include a same material or a different material than the transformation lens material of the transformation lens 214. In such embodiments, the index of refraction may be different for the compensating lens 228 than for the transformation lens 214, and the compensating angle 230 may be different from the transformation angle 216 while still compensating for the interaction with the transformation lens 214, such that the compensated signal light 212-3 may have the same orientation as the input signal light 212-1 from the light source 206.

The mixed compensated signal light 212-3 and compensated external light 226-3 are directed at the same general orientation, toward an exit pupil 236. In some embodiments, the exit pupil 236 may approximate the position of a user's eye during use (e.g., the eye center 110 location). In other embodiments, the exit pupil 236 may approximate the position of another photoreceptor, for example, that of a camera or machine.

As described above, FIG. 2A illustrates an embodiment of a waveguide assembly that allows signal light from the light source 206 to be mixed with an external light within a substantially planar waveguide to overlay a computer generated image onto the visual image of the user's environment, with minimal distortion to the projected light images.

Figure 2B:
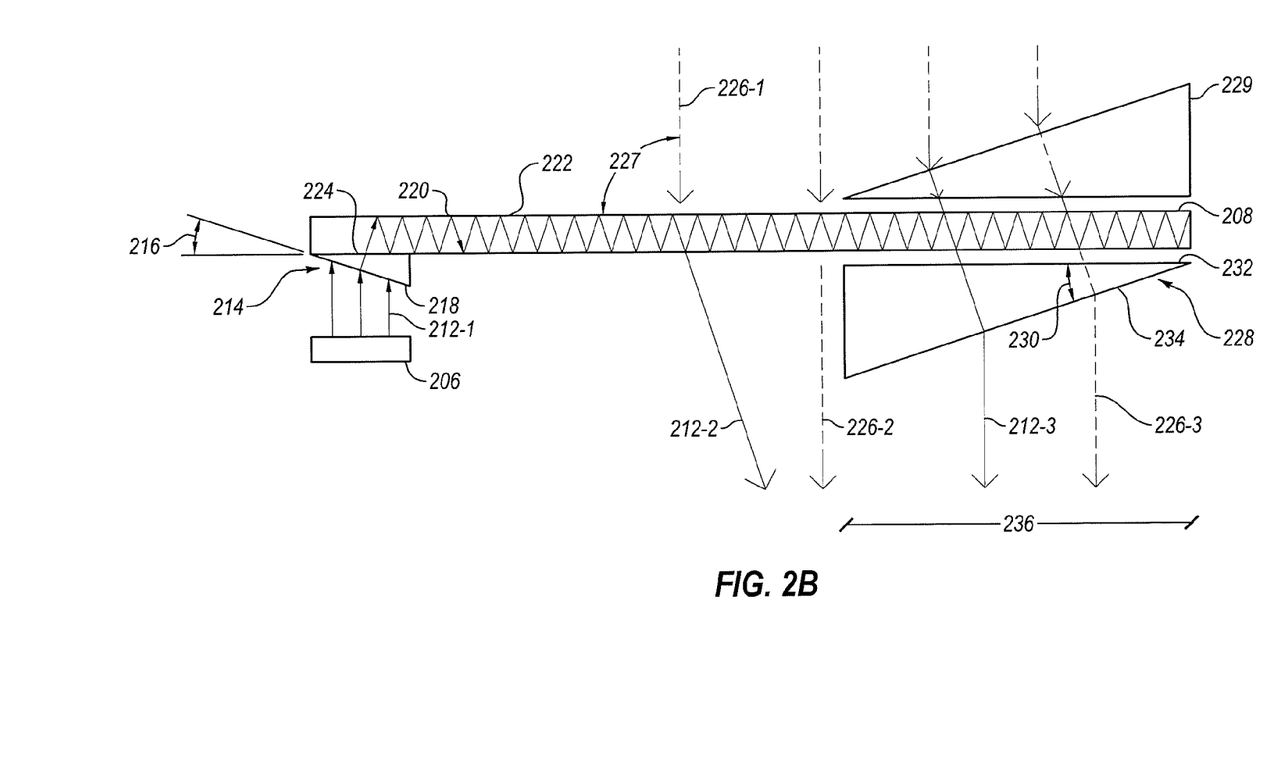
FIG. 2B illustrates another embodiment similar to the embodiment of FIG. 2A, except the transformation lens is positioned on an opposite side of the waveguide assembly from what is shown in FIG. 2A.

FIG. 2B shows an alternative embodiment, referred to herein a 'mirror-mode' embodiment. This embodiment is similar to the embodiment of FIG. 2A, but the transformation lens 214 is positioned on the opposite side of the waveguide assembly, so as to receive input light 212-1 from a light source 206 that is positioned on the same of the waveguide as the user's eye and which is also the same side where the output light is ultimately projected.

Figure 3:
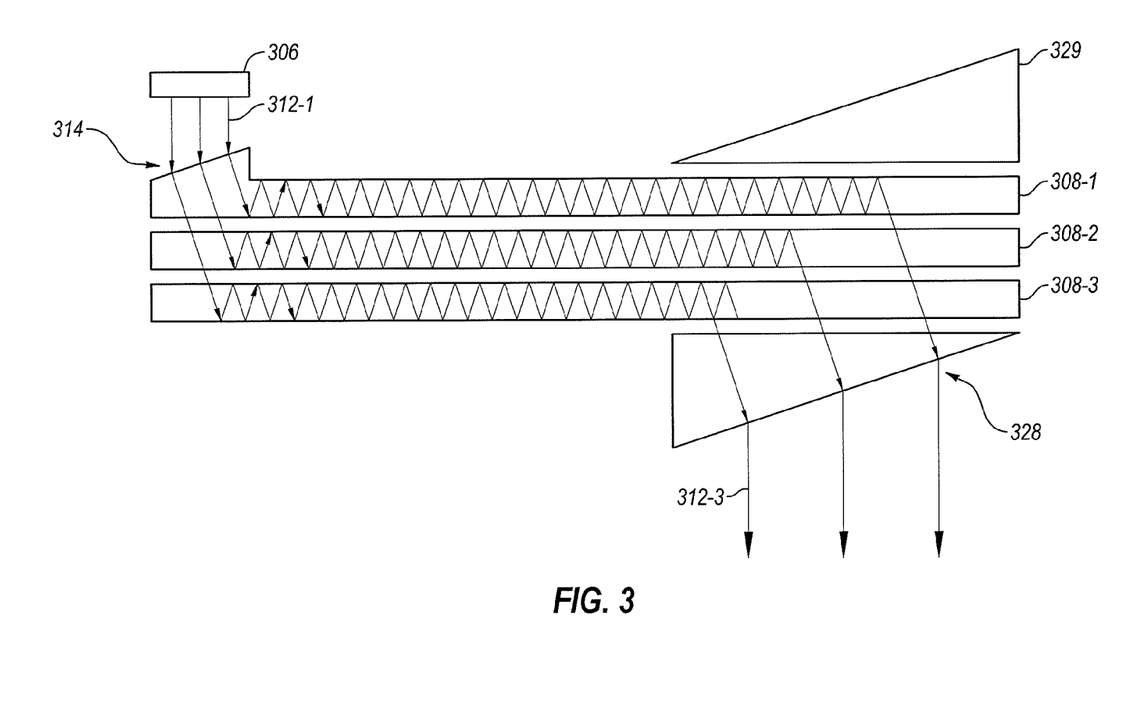
FIG. 3 illustrates light movement through a waveguide assembly, which includes a plurality of waveguides, according to one or more of the disclosed embodiments.

Attention will now be directed to FIG. 3, which illustrates an embodiment of a waveguide assembly with a plurality of separate waveguides to propagate different signal lights through the waveguide assembly. For example, a red, green, and blue (RGB) based NED device may be configured to include three stacked waveguides 308-1, 308-2, 308-3 for each eye, e.g., one tuned to propagate red light, one tuned to propagate green light, and one tuned to propagate blue light. In other words, different waveguides may have different optical transmission spectra. Each output waveguide can include one or more DOEs designed to guide light of a particular range of wavelengths to propagate within and through the waveguide via diffraction.

As shown in FIG. 3, a transformation lens 314 may be positioned on a first waveguide 308-1 to transform the signal light 312-1 from the light source 306. In the depicted embodiment, the transformation lens 314 is integrally formed with the first waveguide 308-1. In other embodiments, a transformation lens 314 may be affixed to a waveguide with a mechanical fastener, with a mechanical interlock, an adhesive, a compression fit, a friction fit, a clamp, tape, other connection methods, or combinations thereof. The waveguides may also be affixed with similar or different connection methods.

The first waveguide 308-1, second waveguide 308-2, and/or third waveguide 308-3 may be tuned to propagate a different wavelength of the input signal light 312-1 along a length thereof. Dispersion of the input signal light 312-1 within the transformation lens 314 and/or the waveguides 308-1, 308-2, 308-3 causes the input signal light 312-1 to disperse into different wavelengths at different angles, thereby allowing the input signal light 312-1 to be divided along the plurality of waveguides.

At least one of the first waveguide 308-1, second waveguide 308-2, and/or third waveguide 308-3 of the plurality of waveguides have an out-coupling DOE to out-couple the signal light from the waveguide(s) such that the signal light may be transmitted through a compensating lens 328. The output signal light 312-3 may include recombined light of each of the wavelengths propagated by each of the waveguides. The output signal light 312-3 may be mixed with external light, (as described in relation to FIG. 2A) through an external light transformation lens 329 proximal the first waveguide 308-1 and through the compensating lens 328.

Figure 4A:
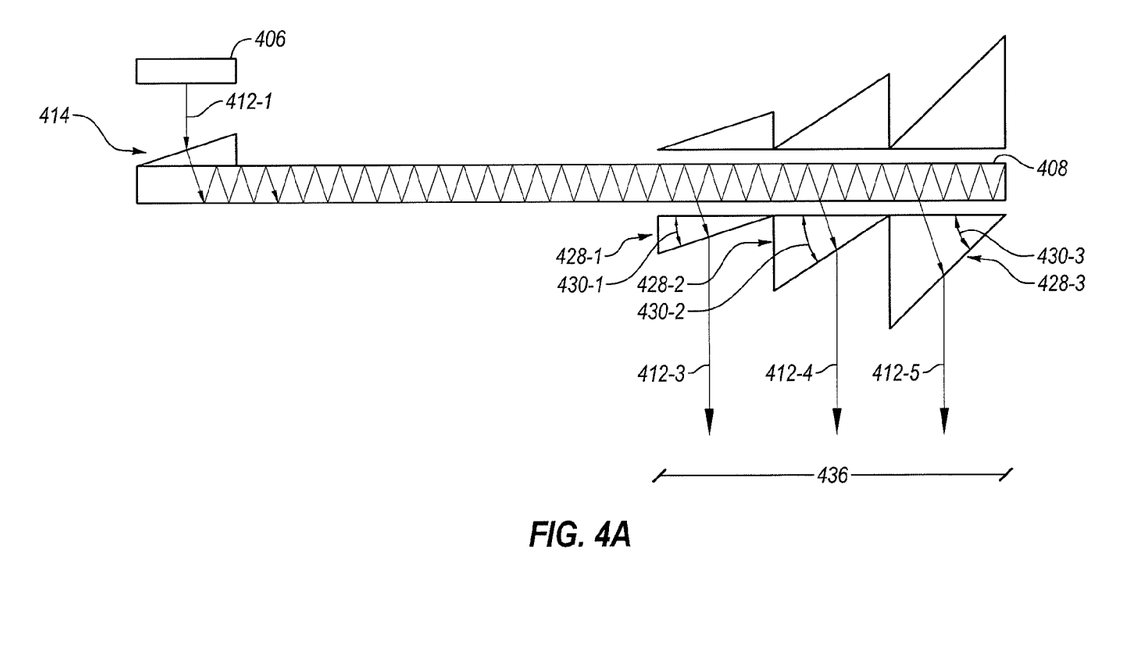
FIG. 4A illustrates light movement through a waveguide assembly, which includes a transformation lens and a plurality of compensating lenses, according to one or more of the disclosed embodiments.
Figure 4B:
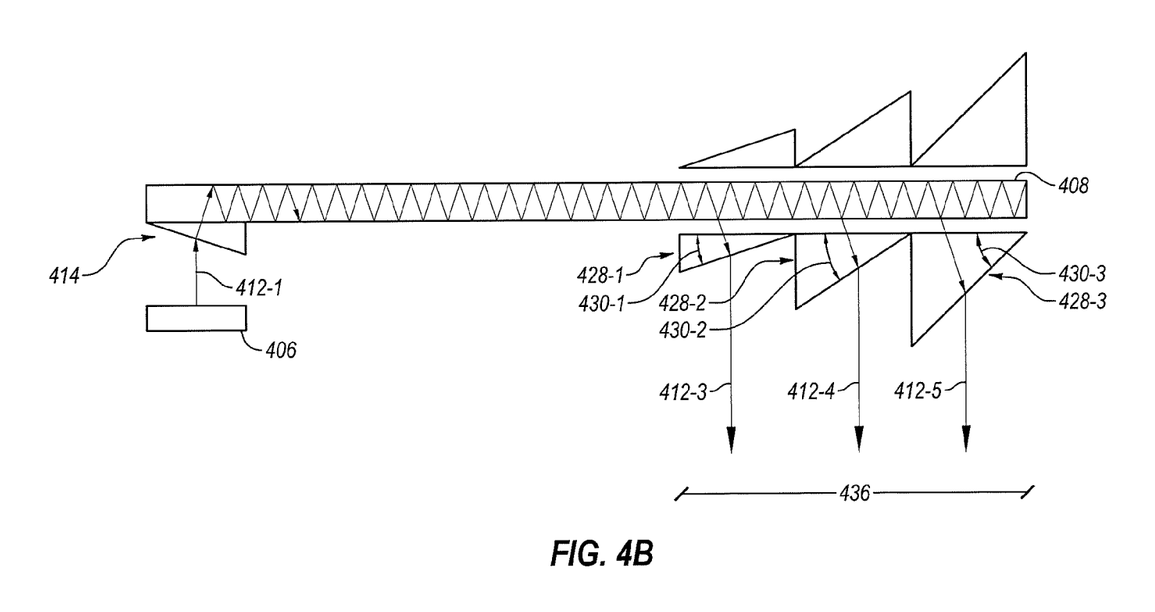
FIG. 4B illustrates another embodiment similar to the embodiment of FIG. 4A, except the transformation lens is positioned on an opposite side of the waveguide assembly from what is shown in FIG. 4A.

FIGS. 4A-4B illustrate another embodiments of a waveguide assembly, wherein the compensating lens is a Fresnel-style compensating lens, according to the present disclosure. The illustrated waveguide assemblies include a waveguide 408 with a plurality of compensating lenses 428-1, 428-2, 428-3 proximal the waveguide 408 to provide the refraction through the compensating lens, as described in relation to FIG. 2 and FIG. 3, while reducing the thickness of the compensating lens(es) normal to the waveguide 408.

In some embodiments, at least two of the plurality of compensating lenses have equal compensating angles. In other embodiments, at least one of the plurality of compensating lenses have a different compensating angle from one of the other compensating lenses. For example, as described in relation to FIG. 3, the input signal light 412-1 from the light source 406 may pass through transformation lens 414 and then disperse. This light 412-1 may propagate at different wavelengths internally along the waveguide 408 at different angles. The waveguide 408 may also be configured to include compensating lenses having different compensating angles to out-couple and/or refract the light at different wavelengths.

FIGS. 4A and 4B are similar and have similar components, but they are positioned differently. For instance, the embodiment of FIG. 4B corresponds to the 'mirror-mode' embodiment described above in FIG. 2B. This embodiment is the same as the embodiment of FIG. 4A, except for the positioning of the transformation lens 414 and light source 406, which are positioned on the same side as the user's eye in FIG. 4B and on the opposing side as the user's eye in FIG. 4A.

In the depicted embodiments of FIGS. 4A-4B, a first compensating lens 428-1 and a second compensating lens 428-2 have a first compensating angle 430-1 and a second compensating angle 430-2, respectively. The first compensating angle 430-1 is less than the second compensating angle 430-2. The third compensating lens 428-3 have a third compensating angle 430-3 that is different from the first compensating angle 430-1 and/or the second compensating angle 430-2.

The first compensating lens 428-1 may refract light by a first amount to create a first compensated signal light 412-3, the second compensating lens 428-2 may refract light by a second amount to create a second compensated signal light 412-4, and the third compensating lens 428-3 may refract light by a third amount to create a third compensated signal light 412-5. In some embodiments, the first amount, second amount, and third amount of refraction are the same, such that signal light is direct toward the exit pupil 436 in substantially parallel paths of the first compensated signal light 412-3, second compensated signal light 412-4, and third compensated signal light 412-5.

In such embodiments, the first compensating lens 428-1, second compensating lens 428-2, and third compensating lens 428-3 are each preferably tuned to refract a different wavelength, such that signal light is direct toward the exit pupil 436 in substantially parallel paths of the first compensated signal light 412-3 of a first wavelength, a second compensated signal light 412-4 of a second wavelength, and a third compensated signal light 412-5 of a third wavelength.

In some embodiments, the first amount, second amount, and third amount of refraction are different, such that signal light is direct toward the exit pupil 436 in non-parallel (i.e., converging or diverging) paths of the first compensated signal light 412-3, second compensated signal light 412-4, and third compensated signal light 412-5. For example, the signal light may disperse into a different wavelengths, and the different wavelengths may be refracted by different amounts by the plurality of compensating lenses, such that the different wavelengths of the first compensated signal light 412-3, second compensated signal light 412-4, and third compensated signal light 412-5 follow converging paths. In at least one example, the converging first compensated signal light 412-3, second compensated signal light 412-4, and third compensated signal light 412-5 may converge at or near the exit pupil 436.

In some embodiments, the plurality of compensating lenses have the same index of refraction. In other embodiments, at least one compensating lens of the plurality of compensating lenses has a different index of refraction from one or more of the other compensating lenses. In at least one embodiment, a first compensating lens 428-1 and a second compensating lens 428-2 have different compensating angles and different indices of refraction such the first compensating lens 428-1 and second compensating lens 428-2 refract light by the same amount.

Figure 5A:
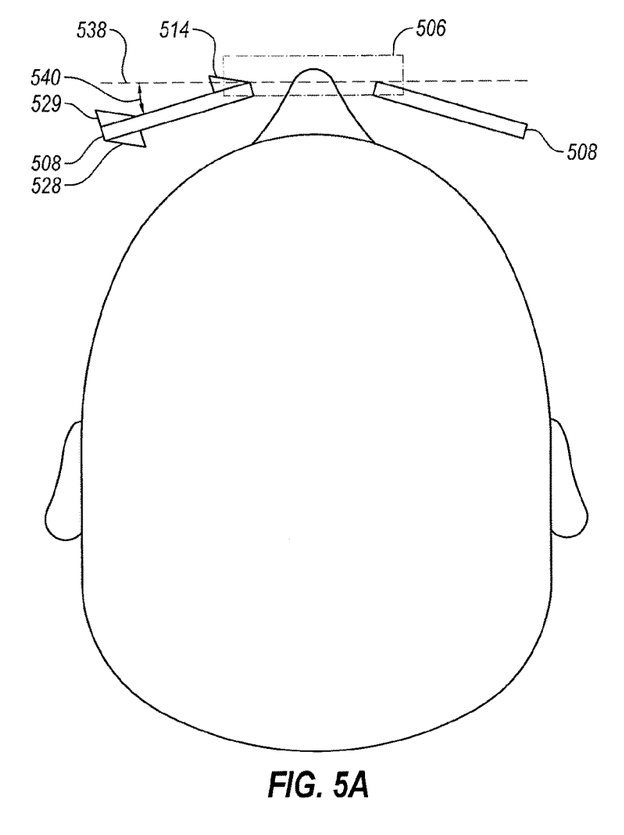
FIG. 5A illustrates a waveguide assembly with a real wrap relative to a user, according to one or more of the disclosed embodiments.
Figure 5B:
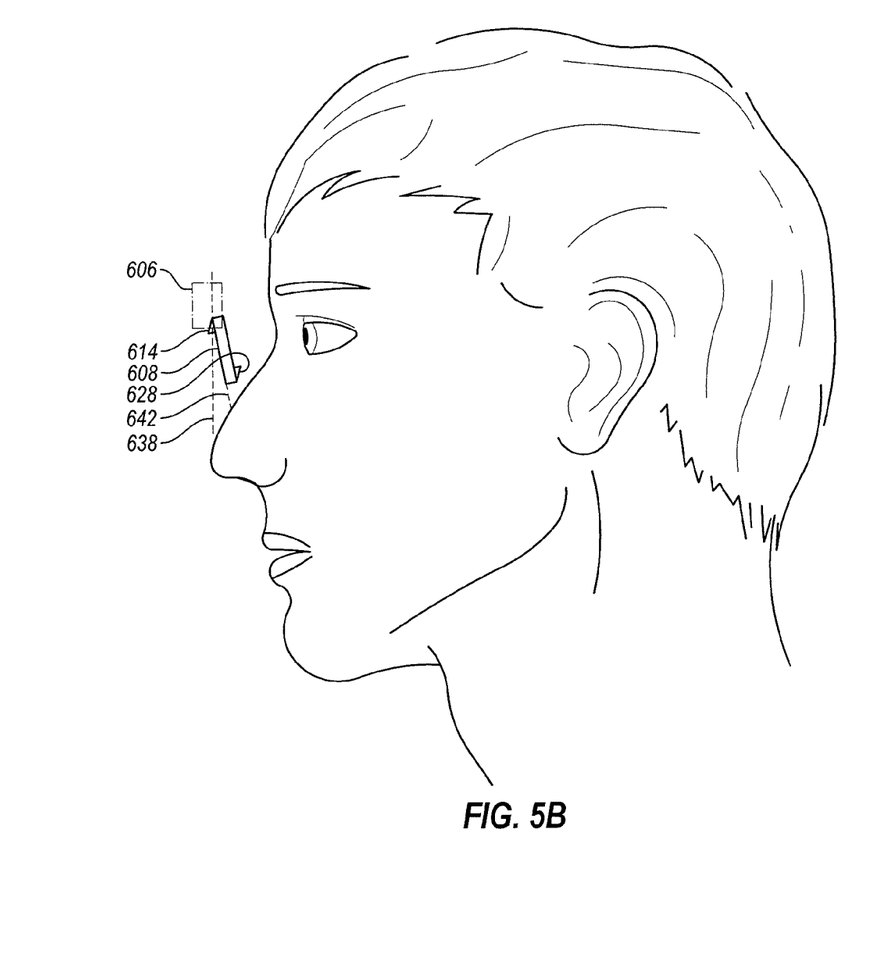
FIG. 5B illustrates a waveguide assembly with a real tilt relative to a user, according to one or more of the disclosed embodiments.

While the transformation lens and compensating lens have been described herein as providing an "artificial tilt and wrap" to a substantially planar waveguide, the transformation lens and compensating lens may be utilized in addition to a "real tilt and wrap" as shown in FIG. 5A and FIG. 5B.

FIG. 5A illustrates a schematic top view of an embodiment of a plurality of waveguides 508 positioned relative to a plane 538 in front of a user. The plane 538 is normal to the direction of the user's sight and is vertical relative to the user's face. The rotation of the waveguides 508 relative to the plane 538 when viewed vertically (as in FIG. 5A) defines the real wrap of the waveguides 508.

The real wrap of the waveguide 508, within the scope of the disclosed embodiments, may be combined with the use of transformation lenses 514, external transformation lenses 529, compensating lenses 528 and/or any combinations thereof. In some embodiments, the wrap angle 540 of the waveguide 508 relative to the plane 538 is within a range having an upper value, a lower value, or an upper and lower value including any of 1°, 5°, 10°, 15°, 20°, 25°, 30°, 35°, 40°, 45°, or any values there between. For example, the wrap angle 540 may be greater than 1°. In another example, the wrap angle 540 may be less than 45°. In yet another example, the wrap angle 540 may be between 5° and 45°. In further examples, the wrap angle 540 may be between 20° and 35°. In at least one example, the wrap angle 540 may be less than 30°. The wrap angle 540 may also be less than 1° or greater than 45°.

A total wrap of a waveguide 508 is, in some embodiments, the sum of the transformation angle, such as the transformation angle 216 described in relation to FIG. 2, in a horizontal direction of the waveguide 508 and the wrap angle 540. In some embodiments, the total wrap of a waveguide 508 is in a range having an upper value, a lower value, or an upper and lower value including any of 1°, 5°, 10°, 15°, 20°, 25°, 30°, 35°, 40°, 45°, or any values there between. For example, the total wrap may be greater than 1°. In another example, the total wrap may be less than 45°. In yet another example, the total wrap may be between 5° and 45°. In further examples, the total wrap may be between 20° and 35°. In at least one example, the total wrap may be less than 30°. The total wrap may also be less than 1° or greater than 45°.

FIG. 5B illustrates a schematic side view of an embodiment of a waveguide 608 positioned relative to a plane 638 in front of a user. The plane 638 may be similar to or the same as the plane 538 described in relation to FIG. 5A. For example, the plane 638 is generally normal to the direction of the user's sight and vertical, relative to the user's face. The rotation of the waveguide 608 relative to the plane 638 when viewed from the side (as in FIG. 5B) defines the real tilt of the waveguide 608.

The real tilt of the waveguide 608 may be combined with the use of transformation lenses 614, external transformation lenses 629, compensating lenses 628, or combinations thereof. In some embodiments, the tilt angle 642 of the waveguide 608 relative to the plane 638 may be in a range having an upper value, a lower value, or an upper and lower value including any of 1°, 5°, 10°, 15°, 20°, 25°, 30°, 35°, 40°, 45°, or any values there between. For example, the tilt angle 642 may be greater than 1°. In another example, the tilt angle 642 may be less than 45°. In yet another example, the tilt angle 642 may be between 5° and 45°. In further examples, the tilt angle 642 may be between 20° and 35°. In at least one example, the tilt angle 642 may be less than 30°. The tilt angle 642 may also be less than 1° or greater than 45°.

A total tilt of a waveguide 608 is, in some embodiments, the sum of the transformation angle, such as the transformation angle 216 described in relation to FIG. 2, in a vertical direction relative to the waveguide 608 and the tilt angle 642. In some embodiments, the total tilt of a waveguide 608 may be in a range having an upper value, a lower value, or an upper and lower value including any of 1°, 5°, 10°, 15°, 20°, 25°, 30°, 35°, 40°, 45°, or any values there between. For example, the total tilt may be greater than 1°. In another example, the total tilt may be less than 45°. In yet another example, the total tilt may be between 5° and 45°. In further examples, the total tilt may be between 20° and 35°. In at least one example, the total tilt may be less than 30°. The total tile may also be less than 1° or greater than 45°.

Figure 6:
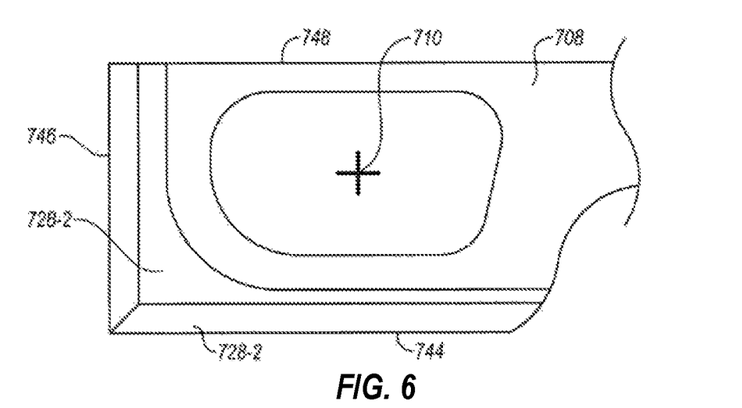
FIG. 6 illustrates a waveguide assembly having a plurality of different compensating lens in combination, according to one or more of the disclosed embodiments.

FIG. 6 schematically illustrates a rear view of another embodiment of a waveguide 708 configured to guide light to a target location 710 of user's eye or other photoreceptor. The waveguide 708 has a bottom edge 744, an exterior edge 746, and a top edge 748. The waveguide 708 may have compensating lenses positioned along or proximal to any of the edges of the waveguide 708. For example, the depicted embodiment has a first compensating lens 728-1 that is at least partially curved and is proximal the bottom edge 744 and the exterior edge 746. A second compensating lens 728-2 includes substantially straight segments that are positioned at the bottom edge 744 and the exterior edge 746. In some embodiments, a waveguide 708 may have a plurality of compensating lenses with at least one compensating lens with a curved portion and at least one compensating lens with a substantially straight segment.

In some embodiments, a waveguide may include a plurality of compensating lenses that are equidistant from one another. For example, the waveguide may include a plurality of curved concentric compensating lenses. In yet other embodiments, a waveguide may include a plurality of concentric compensating lenses that include one or more substantially straight segments.

Figure 7:
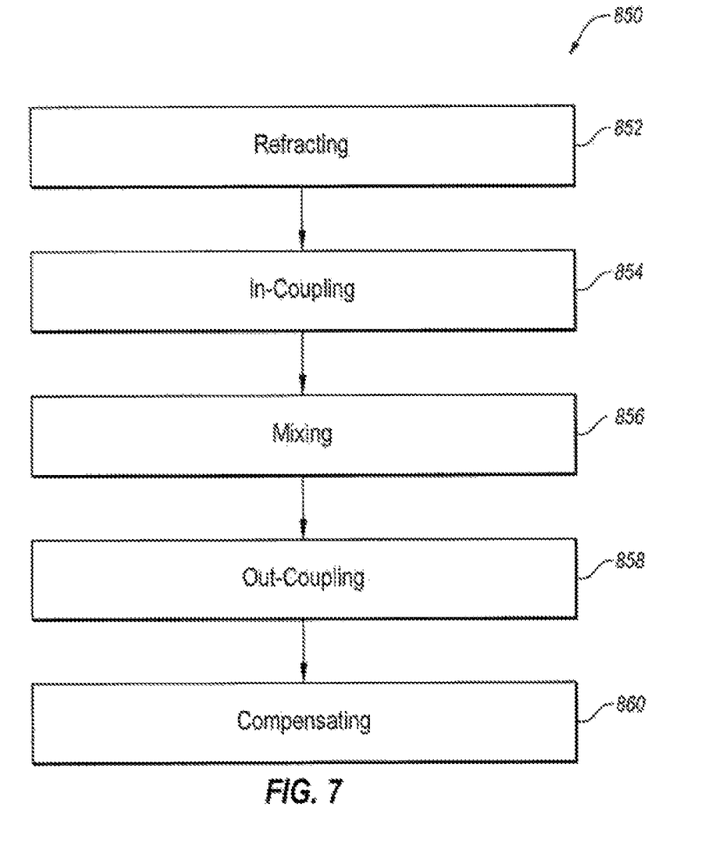
FIG. 7 illustrates a flowchart depicting various acts associated with methods for guiding light through a waveguide assembly, according to one or more of the disclosed embodiments.

FIG. 7 illustrates a flowchart 850 of acts associated with methods for guiding light through a waveguide, according embodiments of the present disclosure. These acts include refracting 852 a signal light through a transformation lens and in-coupling 854 the signal light to a waveguide. The signal light propagates through the waveguide by total internal reflection. The signal light is then mixed 856 with the external light. The disclosed acts also include out-coupling 858 at least the signal light from the waveguide and compensating 860 for the transformation lens refraction by refracting the outgoing signal light with a compensating lens allows the signal light and the external light to pass to a photoreceptor, such as a user's eye, in a MR image.

In some embodiments, the signal light is provided to the transformation lens by a light source such as an image generator or microdisplay device. In other embodiments, the signal light is provided by a plurality of light sources. For example, a first light source may provide the red light portion of an image, a second light source may provide a green light portion of an image, a third light source may provide a blue light portion of an image, and the three light sources may provide a composite RGB image when the three portions are combined.

In some embodiments, the signal light is propagated along a single waveguide. In other embodiments, the signal light propagates along a plurality of waveguides. For example, a plurality of waveguides may be stacked and each of the waveguides may be tuned to guide a different wavelength range of light along the waveguide. In another example, the stacked waveguides may be parallel to one another. The signal light may be split, such as by dispersion and/or by a prism and in-coupled to each waveguide of the plurality of waveguides. In other embodiments, the different wavelengths of the signal light may be provided from discrete light sources, as described herein, and in-coupled to each waveguide, respectively.

In some embodiments, the in-coupling 854 may be performed by a DOE positioned between the transformation lens and the waveguide. In other embodiments, the DOE is positioned on the second surface of the waveguide, so that the first surface may remain flat. Alternatively, the in-coupling 854 is performed by positioning the DOE in or on both of the surfaces, so as to thereby provide a 'dual-side' DOE.

In some embodiments, the out-coupling 858 may be performed by a DOE positioned between the compensating lens and the waveguide. In other embodiments, the out-coupling 858 is performed by positioning grating on the second surface of the waveguide, so that the first surface may remain flat. Alternatively, the out-coupling 858 is performed by positioning the DOE in or on both of the surfaces, so as to thereby provide a 'dual-side' DOE for the out-coupling 858.

In some embodiments, refracting 852 includes refracting external light approaching the front surface of the waveguide with an external transformation lens and compensating 860 for the refraction includes refracting the external light that escapes the back surface of the waveguide with a compensating lens.

One or more of the devices, systems, and methods of the present disclosure allows mixing of external light and a computer-generated signal light with a greater FOV than a conventional waveguide or NED system. The transformation and compensating lenses may allow for an increased field of view with little or no change to the real tilt and wrap of the waveguides relative to a housing or to a user. A combination of real tilt and wrap with transformation and compensating lenses according to the present disclosure may allow for an increased field of view with lesser wrap angles and lesser tilt angles, as well as thinner transformation and/or compensating lenses (e.g., lesser transformation angle and/or compensating angle) than with either technique alone, thereby improving optical performance and comfort for a user.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A display system comprising:
   a light source optically coupled to a waveguide and oriented to provide a signal light to the waveguide, the waveguide including:
   a front surface and a back surface, the back surface facing an exit pupil adapted to align with a user's eye proximate the back surface and such that the back surface faces an eye of a user wearing the display system during use of the display system, the waveguide configured to receive external light at the front surface and transmit the external light and the signal light through the waveguide to the back surface;
   an external light transformation lens located on the front surface of the waveguide configured to direct external light toward the front surface of the waveguide, the external light transformation lens having a planar external light input surface oriented away from the waveguide and an external light output surface oriented toward the front surface of the waveguide, and a non-zero external light transformation angle formed between the planar external light input surface and the external light output surface; and
   a compensating lens located on the back surface of the waveguide configured to direct the external light and the signal light emitted from the back surface of the waveguide toward the exit pupil proximate the back surface, the compensating lens having an input surface oriented toward the back surface of the waveguide, the input surface being parallel to the external light output surface, and an opposing planar output surface oriented away from the waveguide and toward the exit pupil, and a non-zero compensating angle formed between the input surface and the planar output surface of the compensating lens.

2. The display system of claim 1, further comprising a plurality of waveguides oriented parallel to one another.

3. The display system of claim 1, wherein the compensating lens has a compensating angle less than 45 degrees.

4. The display system of claim 1, wherein the compensating lens is a wedge.

5. The display system of claim 1, wherein the compensating lens includes a plurality of lenses.

6. The display system of claim 1, further comprising a transformation lens having a non-zero transformation angle between an input surface of the transformation lens and the front surface of the waveguide.

7. The display system of claim 6, wherein the transformation lens comprises an in-coupling diffraction optical element and wherein the transformation angle and the compensating angle are equal.

8. A head mounted near eye display system comprising:
   a light source optically coupled to a waveguide assembly and oriented to provide a signal light to the waveguide assembly, the waveguide assembly including:
   a first waveguide having a front surface and a back surface, the back surface facing an exit pupil adapted to align with a user's eye proximate the back surface during use, the first waveguide configured to receive external light at the front surface and transmit the external light and the signal light through the first waveguide to the back surface,
   an external light transformation lens located on the front surface of the first waveguide configured to direct external light toward the front surface of the first waveguide, the external light transformation lens having a planar external light input surface oriented away from the first waveguide and an external light output surface oriented toward the front surface of the first waveguide, and a non-zero external light transformation angle formed between the planar external light input surface and the external light output surface; and
   a compensating lens located proximate the back surface of the first waveguide and configured to direct the external light and the signal light emitted from the back surface of the first waveguide toward the exit pupil proximate the back surface, the compensating lens having an input surface oriented toward the back surface of the first waveguide, the input surface being parallel to the external light output surface, and an opposing planar output surface oriented away from the first waveguide and toward the exit pupil, and a non-zero compensating angle formed between the input surface and the planar output surface; and
   a housing configured to support the light source and the waveguide assembly on a user's head.

9. The system of claim 8, wherein the waveguide assembly has at least a top edge, a bottom edge, and an exterior edge, a portion of the compensating lens being located along at least a part of the exterior edge.

10. The system of claim 9, wherein a portion of the compensating lens is located along at least a part of the bottom edge.

11. The system of claim 8, wherein the waveguide assembly includes a second waveguide parallel to the first waveguide.

12. The system of claim 11, wherein the first waveguide and second waveguide have different optical transmission spectra.

13. The system of claim 8, wherein the compensating lens is integrally formed with the first waveguide.

14. The system of claim 8, further comprising a transformation lens having a non-zero transformation angle between an input surface of the transformation lens and the front surface of the waveguide, the transformation angle being equal to the compensating angle.

15. The system of claim 14, wherein the transformation lens has an input surface proximate the light source and an output surface proximate the first waveguide, the system further comprising an in-coupling diffraction optical element located adjacent the output surface of the transformation lens.

16. A method of directing light through a waveguide assembly to a user, the method comprising:
refracting a signal light from a light source at an angle relative to a waveguide;
in-coupling the signal light to propagate along the waveguide;
transforming the direction of incoming external light with an external light transformation lens located on a front surface of the waveguide, the external light transformation lens having a planar external light input surface oriented away from the waveguide and an external light output surface oriented toward the front surface of the waveguide, and a non-zero external light transformation angle formed between the planar external light input surface and the external light output surface;
mixing the signal light with an external light;
out-coupling the signal light from the waveguide to output an outgoing signal light; and
compensating the direction of the outgoing signal light with a compensating lens to direct the outgoing signal light toward an exit pupil, the compensating lens being located proximate a surface of the waveguide and having an input surface oriented toward the waveguide, the input surface being parallel to the external light output surface, and an opposing planar output surface oriented away from the waveguide and toward the exit pupil, and having a non-zero compensating angle formed between the input surface and the planar output surface, the output surface facing an eye of a user wearing the waveguide assembly during use.

17. The method of claim 16, wherein refracting the signal light includes using a transformation lens located proximate the waveguide.

18. The method of claim 16, wherein the compensating lens is a wedge having a compensating angle less than 45 degrees.

19. The method of claim 16, wherein the compensating lens is a plurality of lenses having a compensating angle less than 45 degrees.

20. The method of claim 16, further comprising supporting the light source and the waveguide with a wearable housing.

* * * * *